United States Patent
Adenot et al.

(10) Patent No.: US 9,316,181 B2
(45) Date of Patent: Apr. 19, 2016

(54) FLUID VALVE

(75) Inventors: Sébastien Adenot, Pontoise (FR); Grégory Hodebourg, Sartrouville (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 447 days.

(21) Appl. No.: 13/703,907

(22) PCT Filed: Jun. 27, 2011

(86) PCT No.: PCT/FR2011/051486
§ 371 (c)(1),
(2), (4) Date: Feb. 27, 2013

(87) PCT Pub. No.: WO2012/001283
PCT Pub. Date: Jan. 5, 2012

(65) Prior Publication Data
US 2013/0146038 A1    Jun. 13, 2013

(30) Foreign Application Priority Data
Jun. 30, 2010    (FR) ...................................... 10 02768

(51) Int. Cl.
*F02M 25/07*    (2006.01)
*F16K 11/052*    (2006.01)
(Continued)

(52) U.S. Cl.
CPC ....... *F02M 25/0793* (2013.01); *F02M 25/0719* (2013.01); *F02M 25/0773* (2013.01);
(Continued)

(58) Field of Classification Search
CPC .......... F02M 25/0719; F02M 25/0773; F02M 25/0796; F02M 25/0793; F02M 25/0717; F02M 25/0724; F02M 25/0772; F02M 25/0778; F16K 11/0525; F16K 11/074; F16K 31/041; F16K 1/222; F16K 1/2263; F16K 1/2265; F16K 1/2268
USPC ................... 123/568.18, 568.21, 41.4, 41.85; 251/173; 137/15.25, 102, 625.2, 596.1
See application file for complete search history.

(56) References Cited

U.S. PATENT DOCUMENTS 8,627,806 B2 *  1/2014  Festor et al. ............. 123/568.12
2007/0017491 A1 *  1/2007  Maeda ..................... 123/568.18
(Continued)

FOREIGN PATENT DOCUMENTS

FR    2 894 315 A1    6/2007
FR    2 933 469 A1    1/2010
(Continued)

OTHER PUBLICATIONS

International Search Report issued in PCT/FR2011/051486 mailed Oct. 17, 2011 (4 pages).

*Primary Examiner* — Lindsay Low
*Assistant Examiner* — George Jin
(74) *Attorney, Agent, or Firm* — Osha Liang LLP

(57) ABSTRACT

The invention relates to a fluid valve, in particular for the exhaust gas from a motor vehicle engine, comprising a body (30) defining a main duct (31) and an auxiliary duct (32) for the flow of fluid, which auxiliary duct opens into the main duct (31). The valve also comprises: a flap (1) that can move between a closed position, preventing communication between the two ducts (31, 32), and an open position, allowing communication between said ducts (31, 32); and a gasket (2) against which the flap (1) bears when in the closed position. In addition, the above-mentioned body comprises a housing (37) for a motor for actuating the flap (1). According to the invention, the body (30) is configured to define a fluid lamina (38) between the gasket (2) and the housing (37).

9 Claims, 2 Drawing Sheets

Figure 1:
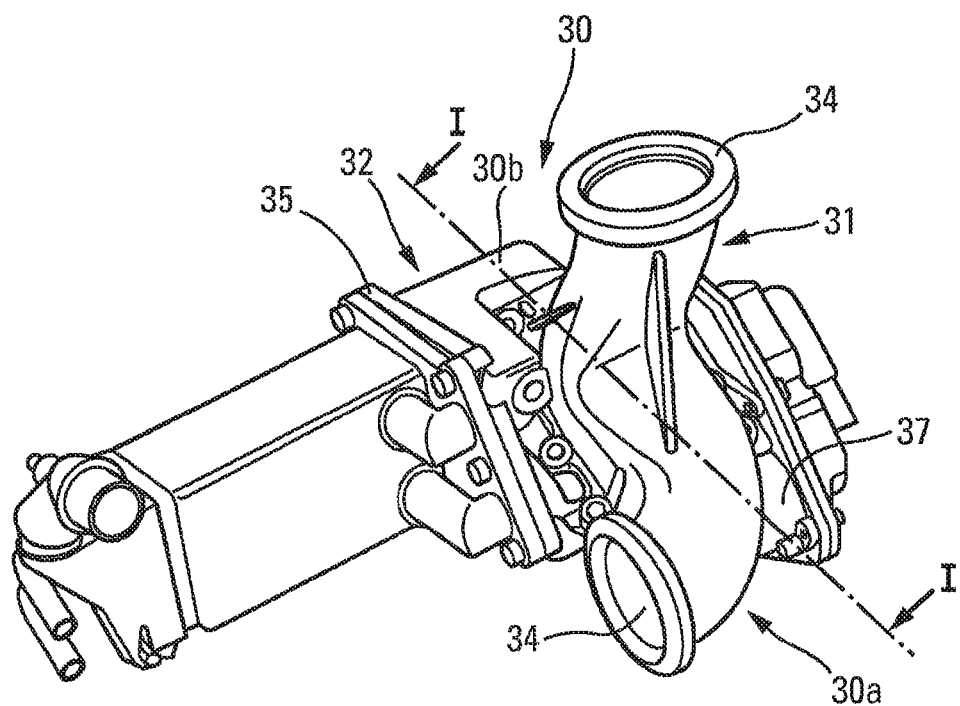

(51) Int. Cl.
  *F16K 31/04* (2006.01)
  *F16K 1/22* (2006.01)
  *F16K 1/226* (2006.01)
  *F16K 27/02* (2006.01)

(52) U.S. Cl.
  CPC ............ *F02M25/0796* (2013.01); *F16K 1/222* (2013.01); *F16K 1/2263* (2013.01); *F16K 11/0525* (2013.01); *F16K 27/0218* (2013.01); *F16K 31/041* (2013.01); *Y02T 10/121* (2013.01)

(56) References Cited

U.S. PATENT DOCUMENTS

2007/0068500 A1\* 3/2007 Joergl et al. .............. 123/568.24
2008/0296525 A1\* 12/2008 Albert ...................... 251/129.11
2011/0139132 A1\* 6/2011 Smith et al. .............. 123/568.11

FOREIGN PATENT DOCUMENTS

WO   WO 2010000752 A1 \* 1/2010
WO   WO 2010123899 A1 \* 10/2010

\* cited by examiner

FLUID VALVE

The present invention relates to a fluid circulation valve, in particular for exhaust gases from a motor vehicle engine or for a mixture of fresh air and exhaust gases.

Said valve may thus serve to regulate the flow rate of exhaust gases intended to be recirculated to the air intake line of the engine. In particular, it may be used in engine designs, in particular diesel engine designs involving a turbocompressor, said valve being provided on the engine exhaust line downstream of the turbocompressor turbine in order to bleed off some of the gases.

There has already been proposed a valve comprising a body that defines a main duct, for the flow of exhaust gases, and an auxiliary duct, opening into said main duct, for bleeding off that part of the exhaust gases that is intended to be directed toward the intake side of the engine. Said valve comprises a flap that is able to move between a closed position, preventing communication between the two ducts, and an open position, allowing communication between said ducts. It also comprises a seal against which the flap bears when it is in the closed position. A flap actuating motor is provided and the body of the valve comprises a housing for accommodating said motor.

The exhaust gases circulating in the valve are at a temperature of several hundred degrees and a difficulty to be overcome in such a configuration is that of protecting the flap actuating motor. For this purpose, cooling ducts are usually provided in the body of the valve. However, such a solution increases its bulk and leads to an increase in the flow rate to be ensured in the cooling circuit used.

It is the aim of the present invention to remedy these drawbacks and to this end the present invention proposes a fluid circulation valve, in particular for exhaust gases from a motor vehicle engine, comprising a body that defines a main duct and an auxiliary duct for the flow of the fluid, opening into said main duct, said valve also comprising a flap that is able to move between a position, known as the closed position, preventing communication between the two ducts, and a position, known as the open position, that allows communication between said ducts, and a seal against which the flap bears when it is in the closed position, said body comprising a housing for an actuating motor of the flap.

According to the invention, said body is configured to define a fluid gap between said seal and said housing. The thermal insulation of the flap actuating motor is thus improved and the cooling requirements of the valve are reduced. This makes it possible to optimize its size. It is also possible in this way to use motors from a lower technological level since they do not have to withstand very high temperatures.

According to various embodiments of the invention:
said body defines a dish between said seal and said housing, said body comprising a wall between said housing and a bottom, designed to be flat, of said dish;
said seal has an opening for the fluid to pass from one duct to the other and the flap is provided with a first wing and a second wing, said first wing, known as the shutoff wing, making it possible to close said opening when the flap is in the closed position, and said second wing, known as the other wing, making it possible to at least partially close said first duct when the flap is in the open position;
said seal has a blind zone situated facing said other wing when the flap is in the closed position;
said fluid gap is provided between said blind zone of the seal and said body;
said seal and the bottom of said dish are provided parallel to one another;
said body comprises two separate parts secured to one another, each part defining one of said ducts and having an opening that comes into alignment in order to define an aperture for the fluid to pass from one duct to the other, the opening in said seal being positioned in the region of said aperture;
said dish is defined by the part that defines the auxiliary duct;
said part that defines the auxiliary duct also defines said housing for the motor;
when the flap is in the closed position, said shutoff wing and the other of said wings are provided on either side of the seal, said flap comprising an intermediate zone, connecting said first wing and said second wing, that passes through said opening in the seal;
said seal comprises a planar zone having a surface against which said shutoff wing comes to bear via one of its faces, designed to be planar and known as the bearing face of the shutoff wing, and an opposite surface against which the other wing of the flap comes to bear via one of its faces, designed to be planar and known as the bearing face of the other wing, when the flap is in the closed position, said opening for the fluid to pass through and provided in the seal being positioned in the region of said planar zone;
said bearing surface of the shutoff wing and said bearing surface of the other wing of the flap extend in two parallel planes that are distant from one another;
said planes are distant by a dimension corresponding to the thickness of the seal in said planar zone;
the other wing of the flap has a surface on the opposite side from its planar bearing surface and the intermediate zone has an inclined flat between the bearing face of the shutoff wing and said opposite face;
the valve comprises, near the intermediate zone of the flap, a flap articulation axis which is provided off-center with respect to said flap, and, in the direction of the flap articulation axis, said shutoff wing has a dimension extending on either side beyond the dimension by which the intermediate zone extends, at least in the region of a zone of connection between said intermediate zone and said shutoff wing;
said seal has a boss along a part of the passage opening, said part being provided facing the other wing of the flap when the latter is in the closed position, said boss being configured to be compressed by said other wing of the flap when the latter is in the closed position.

Figure 2:
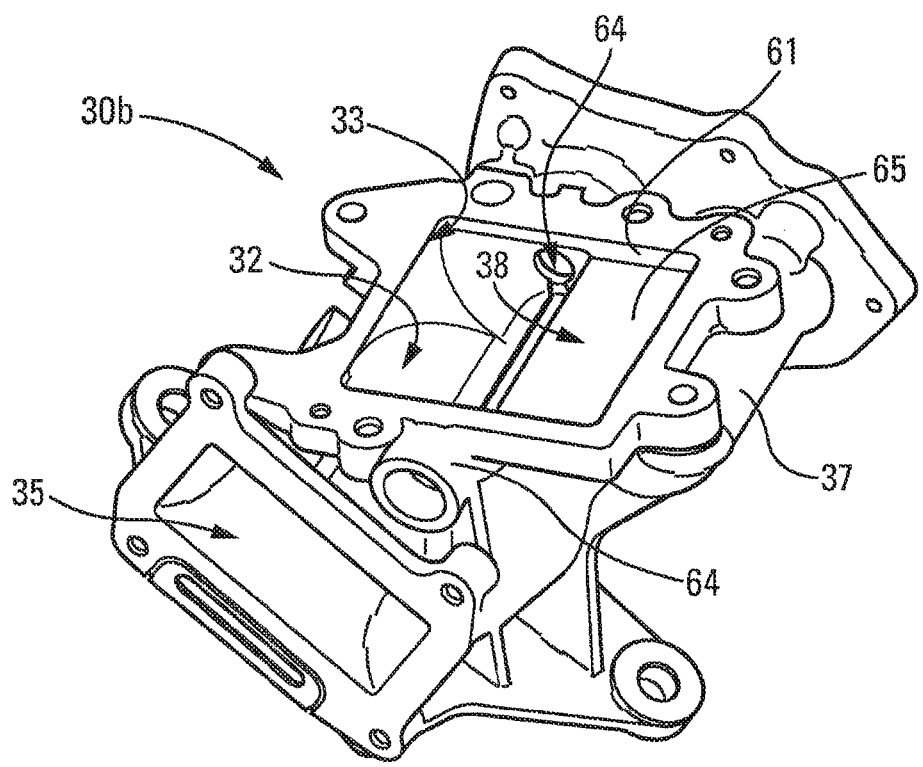
Figure 3:
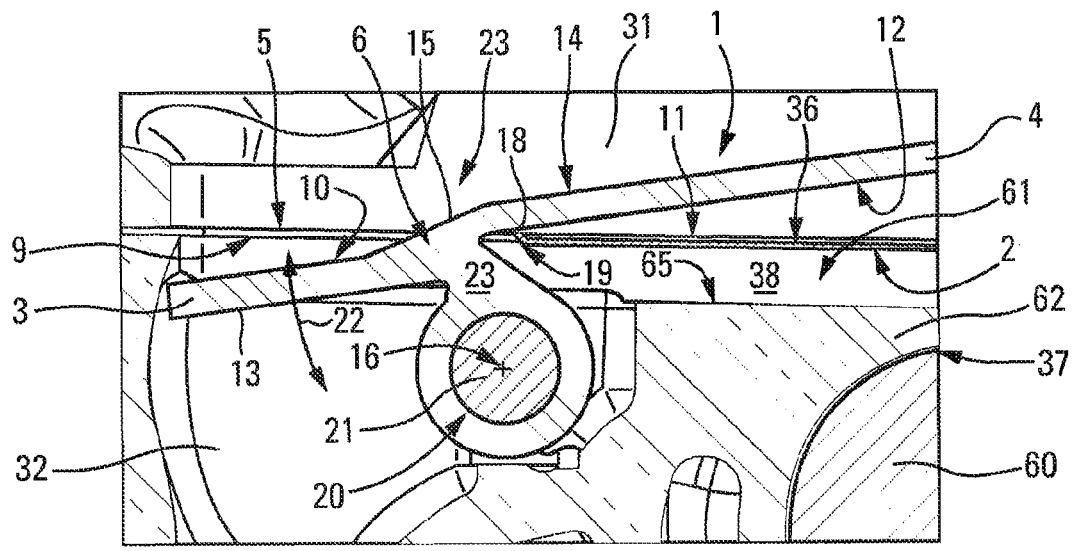
Figure 4:
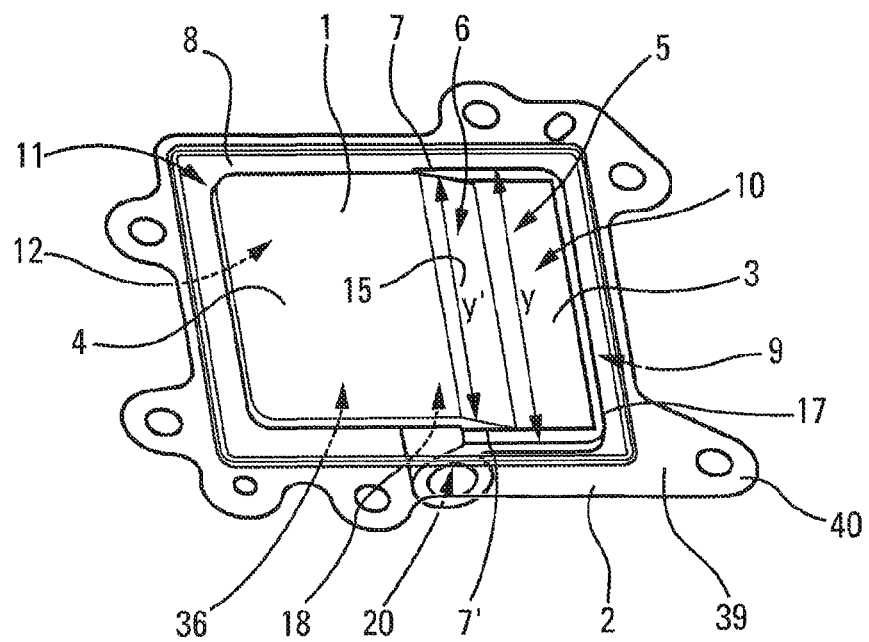

The invention will be better understood from the following description which is given only by way of nonlimiting example and is accompanied by the attached drawings, in which:

FIG. 1 is a perspective illustration of an exemplary embodiment of a valve in accordance with the invention, FIG. 2 is a perspective illustration of a part of the valve from FIG. 1, FIG. 3 is a sectional view of the valve from the preceding figures, the section being taken on a section plane orthogonal to the flap articulation axis, the flap being in a partially open position, FIG. 4 is a perspective illustration of the seal and the flap of the valve from the preceding figures, the flap being in the closed position.

As is illustrated in FIGS. 1 to 3, the valve in accordance with the invention comprises a body 30 that defines a main duct 31 and an auxiliary duct 32 for the flow of the fluid, opening into said main duct 31. The main duct 31 has, for example, inlet and outlet orifices 34 that communicate, in one application example, with the exhaust line of an engine. The auxiliary duct has an orifice 35 that communicates, in the same application example, with an exhaust gas recirculation line.

Said valve also comprises a flap 1 and a seal 2.

Said flap 1 is provided to be able to move between a closed position, preventing communication between the two ducts 31, 32, and an open position, allowing communication between said ducts 31, 32, for example in the region of a fluid passage aperture 33.

Said body 30 also comprises, for example, a housing 37 for a flap actuating motor. Said valve may also comprise a transmission system (not shown) between an output shaft of the motor and a flap pivot shaft 21.

As can be seen in FIGS. 2 and 3, according to the invention said body 30 is configured to define a fluid gap 38 between said seal 2 and said housing 37. This improves the thermal insulation of the flap actuating motor 60.

Said body 30 may be produced in two parts 30a, 30b, each part defining one of said ducts and having an opening that comes into alignment in order to define said aperture 33. This is understood to mean that said two parts of the body 30 are separate and are secured to one another. Said seal 2 thus also acts as a seal between said two parts 30a, 30b with respect to the outside of the valve.

Said body 30 defines, for example, a dish 61 between said seal 2 and said housing 37, said body comprising a wall 62 between said housing 37 and a bottom 65 of said dish 61. The bottom 65 of said dish 61 may be designed to be flat.

Said dish 61 and said housing 37 for the motor are defined, for example, by the part that defines the auxiliary duct 32.

The seal 2 has an opening 5 for the fluid to pass from the duct 31 to the other duct 32. Said opening 5 in the seal is provided, in particular, facing the aperture 33 in the body 30. The flap 1 is provided, for example, with a first wing 3 and a second wing 4.

Said first wing 3, known as the shutoff wing, makes it possible to close the opening 5 in the seal when the flap is in the closed position, and said second wing 4, known as the other wing, makes it possible to at least partially close said first duct 31 when the flap is in the open position. The other wing 4 of the flap is thus involved in the thermal insulation of the motor.

Said seal 2 has, in particular, a blind zone 36 situated facing said other wing 4 when the flap 1 is in the closed position. In other words, the opening 5 in the seal is provided only in the region of the shutoff wing 3, the flap 1 being in the closed position. The fluid gap 38 is also provided between said blind zone 36 of the seal and said housing 37.

When the flap is in an open position, said first wing 3 and said second wing 4 extend one on one side and one on the other of the seal 2, transversely thereto in order to allow the fluid to pass through. In the embodiment illustrated, the flap 1 is inclined with respect to the seal 2 in its maximum open position (not shown).

As illustrated in FIG. 4, said shutoff wing 3 and the other 4 of said wings are provided, for example, on either side of the seal 2 when the flap is in the closed position, and said flap 2 comprises an intermediate zone 6, connecting said first wing 3 and said second wing 4, passing through said opening in the seal, for example in a flush manner, in the region of zones 7, 7' of the contour of said opening 5 in the seal.

Sealing can thus be obtained around the opening 5 in the seal, while at the same time allowing the flap to move between its open position and its closed position without having to leave significant clearances between the opening in the seal and the contour of the flap.

Said seal 2 comprises a planar zone 8 and, returning to FIG. 3, it can be seen that said planar zone has a surface 9 against which said shutoff wing 3 comes to bear via one 10 of its faces, designed to be planar, known as the bearing face of the shutoff wing, and/or an opposite surface 11 against which the other wing 4 of the flap comes to bear via one 12 of its faces, designed to be planar, known as the bearing face of the other wing, when the flap is in the closed position. Said opening 5 for the fluid to pass through and provided in the seal 2 is positioned in the region of said planar zone 8. Sealing is thus provided by face-to-face contact in the region of said wing or wings.

Said blind zone 36 of the seal 2 may also be located in the region of said planar zone 8 of said seal 2 in which the opening 5 in said seal is formed. The bottom 65 of said dish 61 and said blind zone 36 are provided, for example, parallel to one another.

Said bearing surface 10 of the shutoff wing and said bearing surface 12 of the other wing of the flap extend, for example, in two parallel planes that are distant from one another, for example by a dimension corresponding to the thickness of the seal in said planar zone 8. It is thus possible to ensure contacts of the plane-to-plane type.

The shutoff wing 3 has a surface 13 on the opposite side from its bearing surface 10, and the other wing 4 has a surface 14 on the opposite side from its bearing surface 12. These two opposite faces 13, 14 are, for example, planar and the intermediate zone 6 has an inclined flat 15 between the bearing face 10 of the shutoff wing 3 and said opposite face 14 of the other wing 4. This encourages the flow of the fluid at the surface of the flap.

The valve may also comprise a flap 1 articulation axis 16 which is provided off-center with respect to said flap 1 and is situated, for example, near the intermediate zone 6 of the flap.

Said seal 2 has a boss 19 along an opening part 5 of the seal, said boss being provided facing the other wing 4 of the flap when the latter is in the closed position. Said boss is configured to be compressed by said other wing 4 of the flap when the latter is in the closed position. This further improves sealing.

The flap 1 has, for example, a housing 20 for the pivot shaft 21. This is, in particular, a rotational articulation about the articulation axis 16, as is illustrated in FIG. 3 by way of the arrow with the reference 22. Said housing is located, for example, in an extension 23 of the flap, said extension 23 being located, in particular, in the intermediate zone 6. In such an embodiment, said extension 23 extends from the face 13 on the opposite side from the bearing face 10 of the shutoff wing and from the bearing face 12 of the other wing 4 of the flap.

The housing 20 is in this case a through-housing and the shaft 21 emerges on both sides of the housing 20. The shaft 21 is connected to the extension 23 in a manner known per se.

The shutoff wing 3, the other wing 4, the intermediate zone 6 and the extension 23 thereof form, for example, a single component, in particular a casting.

Said extension 23 of the flap accommodating its pivot shaft 21 is located in such a way as to close the volume defined by the dish 61 and the blind zone 36 of the seal 2, i.e. in such a way as to close said fluid gap 61. For this purpose, said body 30 has, for example in the region of the part 30b that defines the auxiliary duct 32, housings 64 for the pivot shaft 21 of the flap.

As is illustrated in FIG. 4, in the direction of the articulation axis of the flap, said shutoff wing has a dimension y extending on either side beyond the dimension y' by which the intermediate zone 6 extends, at least in the region of a zone of connection between said intermediate zone and said shutoff wing. The bearing surface 10 of the shutoff wing 3 can thus have a contact zone 17, in the form of an angular portion of an annulus, with the seal 2 on a first part of the periphery of the opening 5 in the seal, on one side of said seal, while the bearing surface 12 of the other wing 4 has, on the other side of the seal, a contact zone 18 on a complementary part of the periphery of the opening 5 in the seal.

The contact zone 17 provided by the shutoff wing 3 also extends, for example, in line with the intermediate zone 6 in the region of the zones 7, 7'. This then reinforces sealing and it is possible to have an intermediate zone 6 which is not flush with the contour of the opening 5 in the seal.

The opening 5 in the flap has an approximately rectangular contour, as does the shutoff flap 3. In addition, the contact zone 17 of said shutoff wing 3 extends along three sides of said opening. As for the contact zone 18, this extends along the last side. Said intermediate zone 6 is provided facing the contour of said opening 5 over a part of two of its opposite sides. Said other flap 4 may for its part also be rectangular.

The seal 2 has, for example, a peripheral part 39 and said planar zone 8 is situated set back from the peripheral part. Such a seal is obtained, for example, by stamping. Said peripheral part 39 may have extensions 40 that form flanges for attaching it to the body 30.

The invention claimed is:

1. A fluid circulation valve, in particular for exhaust gases from a motor vehicle engine, comprising:
   a body that defines a main duct and an auxiliary duct for the flow of the fluid, opening into the main duct;
   a flap that is able to move between a closed position, preventing communication between the two ducts, and an open position, that allows communication between the ducts; and
   a seal against which the flap bears when the flap is in the closed position, the body comprising a housing for an actuating motor of the flap,
   wherein the body is configured to define a fluid gap between the seal and the housing,
   wherein the seal has an opening for the fluid to pass from one duct to the other and the flap is provided with a first wing and a second wing, the first wing, known as the shutoff wing, allows for closure of the opening when the flap is in the closed position, and the second wing, known as the other wing, allows at least partial closure of the main duct when the flap is in the open position,
   wherein the seal has a blind zone situated facing the other wing when the flap is in the closed position,
   wherein the body defines a dish between the seal and the housing, the dish having a flat bottom,
   wherein the fluid gap is provided directly between the blind zone of the seal and the flat bottom of the dish of the body such that the fluid gap is in contact with the seal, and
   wherein the opening in the seal is provided only in a region of the shutoff wing.

2. The valve as claimed in claim 1, wherein the body further comprises a wall between the housing and the flat bottom of the dish.

3. The valve as claimed in claim 2, wherein the seal and the bottom of the dish are provided parallel to one another.

4. The valve as claimed in claim 2, wherein the body comprises two separate parts secured to one another, each part defining one of the ducts and having an opening that comes into alignment in order to define an aperture for the fluid to pass from one duct to the other, the opening in the seal being positioned in the region of the aperture.

5. The valve as claimed in claim 4, wherein the dish is defined by the part that defines the auxiliary duct.

6. The valve as claimed claim 4, wherein the part that defines the auxiliary duct also defines the housing for the motor.

7. The valve as claimed claim 1, wherein, when the flap is in the closed position, the shutoff wing and the other of the wings are provided on either side of the seal, the flap comprising an intermediate zone, connecting the first wing and the second wing, that passes through the opening in the seal.

8. A fluid circulation valve, in particular for exhaust gases from a motor vehicle engine, comprising:
   a body that defines a main duct and an auxiliary duct for the flow of the fluid, opening into the main duct;
   a flap that is able to move between a closed position, preventing communication between the two ducts, and an open position, that allows communication between the ducts; and
   a seal against which the flap bears when the flap is in the closed position, the body comprising a housing for an actuating motor of the flap,
   wherein the body is configured to define a fluid gap between the seal and the housing,
   wherein the body defines a dish between the seal and the housing, the body further comprising a wall between the housing and a flat bottom of the dish,
   wherein the seal and the flat bottom of the dish are provided parallel to one another, and
   wherein the fluid gap is provided directly between the seal and the flat bottom of the dish of the body such that the fluid gap is in contact with the seal.

9. A fluid circulation valve, in particular for exhaust gases from a motor vehicle engine, comprising:
   a body that defines a main duct and an auxiliary duct for the flow of the fluid, opening into the main duct;
   a flap that is able to move between a closed position, preventing communication between the two ducts, and an open position, that allows communication between the ducts; and
   a seal against which the flap bears when the flap is in the closed position, the body comprising a housing for an actuating motor of the flap,
   wherein the body is configured to define a fluid gap between the seal and the housing,
   wherein the body defines a dish between the seal and the housing, the body further comprising a wall between the housing and a flat bottom of the dish,
   wherein the body comprises two separate parts secured to one another, each part defining one of the ducts and having an opening that comes into alignment in order to define an aperture for the fluid to pass from one duct to the other, the opening in the seal being positioned in the region of the aperture,
   wherein the part that defines the auxiliary duct also defines the housing for the motor, and
   wherein the fluid gap is provided directly between the seal and the flat bottom of the dish of the body such that the fluid gap is in contact with the seal.

* * * * *